United States Patent
Yaoita (10) Patent No.: US 12,438,322 B2
(45) Date of Patent: Oct. 7, 2025

(54) JOINING METHOD FOR TERMINAL-EQUIPPED ELECTRIC WIRE

(71) Applicant: YAZAKI CORPORATION, Tokyo (JP)

(72) Inventor: Syunsuke Yaoita, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/335,101

(22) Filed: Jun. 14, 2023

(65) Prior Publication Data

US 2024/0006836 A1   Jan. 4, 2024

(51) Int. Cl.
*B23K 20/10* (2006.01)
*H01R 4/02* (2006.01)
*H01R 43/02* (2006.01)
*B23K 101/36* (2006.01)
*H01B 7/00* (2006.01)

(52) U.S. Cl.
CPC ......... *H01R 43/0207* (2013.01); *B23K 20/10* (2013.01); *H01R 4/021* (2013.01); *H01R 43/0263* (2013.01); *B23K 2101/36* (2018.08); *H01B 7/009* (2013.01)

(58) Field of Classification Search
CPC ............... H01R 43/0207; H01R 4/021; H01R 43/0263; H01R 4/029; H01R 43/0228; B23K 20/10–106; B23K 2101/36; B23K 2101/38; B23K 20/004; H01B 7/009
USPC ................................................ 228/1.1, 110.1
See application file for complete search history.

(56) References Cited

U.S. PATENT DOCUMENTS

| | | | | |
|---|---|---|---|---|
| 4,852,788 A | * | 8/1989 | Patrikios | H01R 43/0207 228/110.1 |
| 2009/0218134 A1 | * | 9/2009 | Stroh | H01R 43/0214 228/110.1 |
| 2011/0198122 A1 | * | 8/2011 | Sagawa | H01R 4/023 174/84 R |
| 2015/0288123 A1 | * | 10/2015 | Wagner | H01R 4/029 228/110.1 |

(Continued)

FOREIGN PATENT DOCUMENTS

| | | | | | |
|---|---|---|---|---|---|
| CN | 101001712 A | * | 7/2007 | | B23K 20/10 |
| CN | 112074993 A | * | 12/2020 | | H01B 1/02 |

(Continued)

*Primary Examiner* — Kiley S Stoner
(74) *Attorney, Agent, or Firm* — KENEALY VAIDYA LLP (57) ABSTRACT

The present disclosure relates to a joining method for a terminal-equipped electric wire in which a plurality of terminal-equipped electric wires including a first terminal-equipped electric wire and a second terminal-equipped electric wire are joined each other. The joining method includes a first step of placing at least a conductor core wire of the first terminal-equipped electric wire among the plurality of terminal-equipped electric wires on a horn and crushing the conductor core wire of the first terminal-equipped electric wire by the horn and an anvil, and a second step of placing a conductor core wire of at least the second terminal-equipped electric wire among the plurality of terminal-equipped electric wires on the crushed conductor core wire and ultrasonically joining the conductor core wires by the horn and the anvil.

6 Claims, 6 Drawing Sheets

(56) References Cited

U.S. PATENT DOCUMENTS

| | | | | |
|---|---|---|---|---|
| 2016/0064885 A1* | 3/2016 | Matsuoka | .......... | H01R 43/0207 29/879 |
| 2019/0393664 A1* | 12/2019 | Katou | ................ | B23K 37/0426 |
| 2020/0091670 A1* | 3/2020 | Sato | .................... | H01R 43/0207 |
| 2020/0091691 A1* | 3/2020 | Sato | .................... | H01R 43/0207 |
| 2024/0088617 A1* | 3/2024 | Yaoita | .................... | H01R 43/28 |

FOREIGN PATENT DOCUMENTS

| | | | | |
|---|---|---|---|---|
| CN | 117317755 A | * | 12/2023 | ............. B23K 20/10 |
| CN | 117751496 A | * | 3/2024 | ............. B23K 20/10 |
| DE | 102021124876 A1 | * | 3/2022 | ......... H01B 13/0023 |
| DE | 102023205598 A1 | * | 1/2024 | ............. B23K 20/10 |
| EP | 0133883 A1 | * | 3/1985 | |
| EP | 2650984 A1 | * | 10/2013 | ............. B23K 20/10 |
| GB | 2373207 A | * | 9/2002 | ............. B23K 20/10 |
| JP | 2020-5338 A | | 1/2020 | |
| JP | 2020-47422 A | | 3/2020 | |
| JP | 2020064737 A | * | 4/2020 | |
| JP | 2020-136203 A | | 8/2020 | |
| WO | WO-2018088189 A1 | * | 5/2018 | ............. H01B 13/00 |
| WO | WO-2020085038 A1 | * | 4/2020 | ............. H01R 4/021 |

* cited by examiner

JOINING METHOD FOR TERMINAL-EQUIPPED ELECTRIC WIRE

CROSS-REFERENCE TO RELATED APPLICATIONS

This application is based on and claims priority under 35 USC 119 from Japanese Patent Application No. 2022-104796 filed on Jun. 29, 2022, the contents of which are incorporated herein by reference.

TECHNICAL FIELD

The present disclosure relates to a joining method for a terminal-equipped electric wire.

BACKGROUND ART

In general, a power supply device, an electrical device, and the like mounted on a vehicle such as an automobile are often connected to one another by a wire harness in which a plurality of terminal-equipped electric wires are bundled. The plurality of terminal-equipped electric wires constituting the wire harness are electrically connected to each other by, for example, joining conductor core wires exposed from an insulating sheath to each other.

In the related art, various joining methods for the conductor core wires as described above have been proposed, and examples thereof include a joining method (that is, ultrasonic joining) by ultrasonic vibration using a horn and an anvil (for example, see JP2020-047422A and JP2020-136203A).

The ultrasonic joining is metal-to-metal fusion performed by applying ultrasonic vibration to a connection target using a horn and using the applied ultrasonic vibration. Specifically, each of the conductor core wires in the plurality of terminal-equipped electric wires is sandwiched by the horn and the anvil, and portions in which the conductor core wires are overlapped with each other rub against each other by the ultrasonic vibration, so that the conductor core wires are joined in a solid phase state by plastic deformation and a joining portion is formed.

Therefore, in the terminal-equipped electric wire, when the terminal attached to the electric wire has a small plate thickness or when an elastic body is used (that is, an elastic body is provided) for connection to a connection portion of a power supply device, an electrical device, or the like, the terminal is likely to be deformed by the propagated ultrasonic vibration. In addition, depending on the terminal, since the ultrasonic vibration is likely to propagate even when the electric wire is short, deformation is likely to occur. That is, when a terminal having low resistance to the ultrasonic vibration as described above is used among the plurality of terminal-equipped electric wires constituting the wire harness, a contact failure with the connection portion of the power supply device, the electrical device, or the like may occur due to deformation of the terminal, and the connection reliability of the wire harness may be lowered. Hereinafter, a terminal-equipped electric wire using a terminal having low resistance to the ultrasonic vibration is also referred to as a "terminal-equipped electric wire having low resistance to the ultrasonic vibration".

SUMMARY OF INVENTION

The present disclosure provides a joining method for a terminal-equipped electric wire that prevents deformation of a terminal when conductor core wires are joined.

The present disclosure provides a joining method for a terminal-equipped electric wire in which a plurality of terminal-equipped electric wires including a first terminal-equipped electric wire and a second terminal-equipped electric wire are joined each other. The joining method includes a first step of placing at least a conductor core wire of the first terminal-equipped electric wire among the plurality of terminal-equipped electric wires on a horn and crushing the conductor core wire of the first terminal-equipped electric wire by the horn and an anvil, and a second step of placing a conductor core wire of at least the second terminal-equipped electric wire among the plurality of terminal-equipped electric wires on the crushed conductor core wire and ultrasonically joining the conductor core wires by the horn and the anvil.

The present disclosure has been briefly described above. Further, details of the present disclosure will be further clarified by reading through a mode for carrying out the disclosure described below (hereinafter referred to as an "embodiment") with reference to the accompanying drawings.

DESCRIPTION OF EMBODIMENTS

Embodiments

Figure 1:
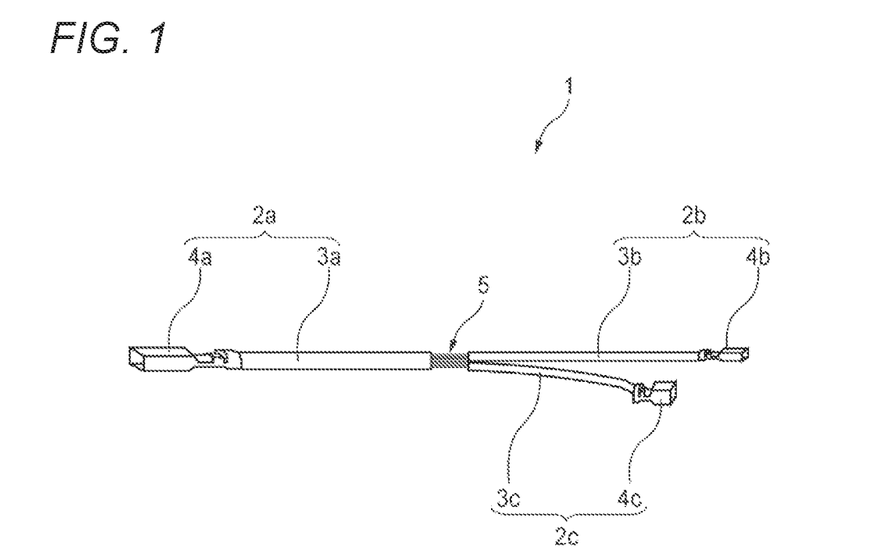
FIG. 1 is a schematic perspective view of a wire harness including a joining portion formed by a joining method for a terminal-equipped electric wire according to embodiments of the present disclosure.
Figure 2:
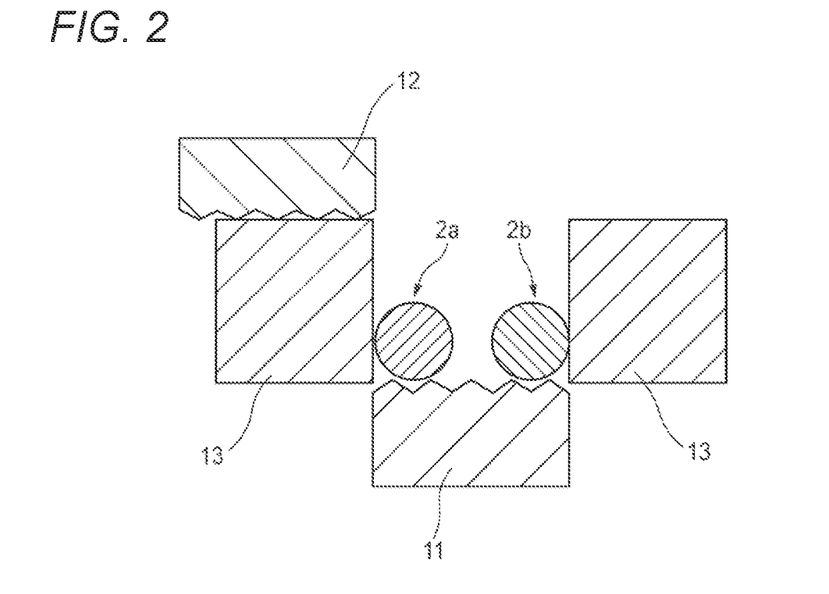
FIG. 2 is a first schematic cross-sectional view showing a joining method for a terminal-equipped electric wire according to a first embodiment.
Figure 3:
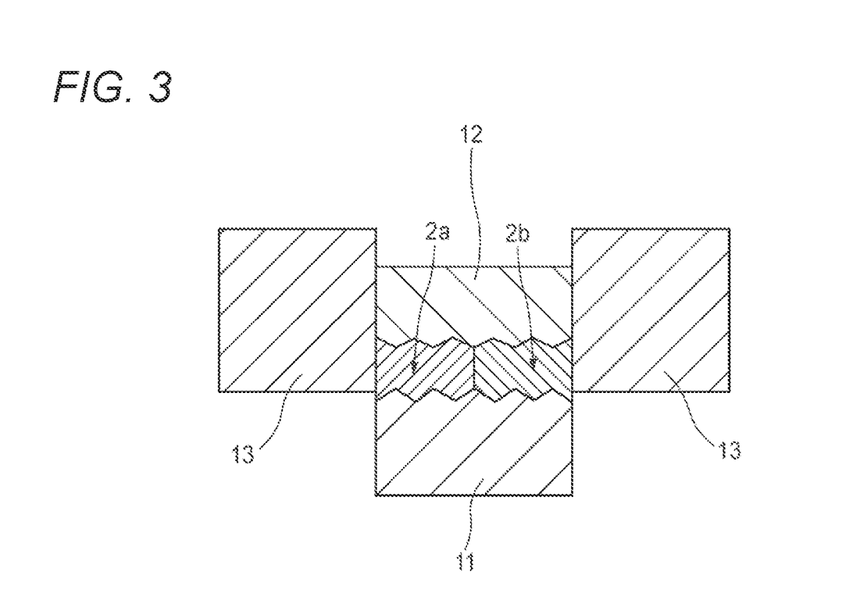
FIG. 3 is a second schematic cross-sectional view showing the joining method for a terminal-equipped electric wire according to the first embodiment.
Figure 4:
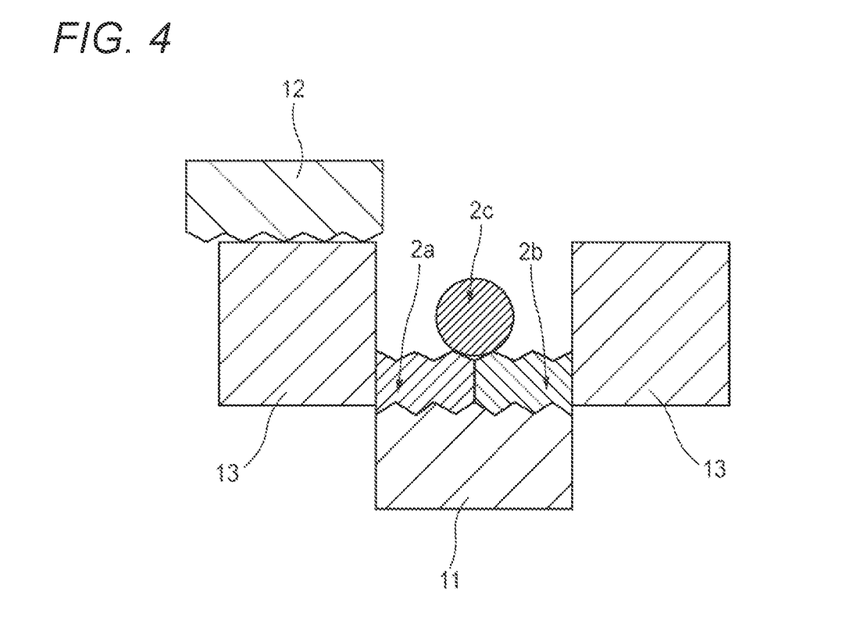
FIG. 4 is a third schematic cross-sectional view showing the joining method for a terminal-equipped electric wire according to the first embodiment.

Hereinafter, a wire harness 1 including a joining portion 5 formed by a joining method for a terminal-equipped electric wire 2 according to embodiments of the present disclosure will be described with reference to FIG. 1. The wire harness 1 is formed by joining exposed conductor core wires in a plurality of (three in this Embodiment) the terminal-equipped electric wires 2, and the terminal-equipped electric wires 2 are electrically connected to each other. That is, the joining portion 5 is formed in the wire harness 1. The wire harness 1 is used to, for example, connect a power supply device, an electrical device, and the like mounted on a vehicle such as an automobile to one another.

The plurality of terminal-equipped electric wires 2 (2a, 2b, 2c) include electric wires 3 (3a, 3b, 3c) and terminals 4 (4a, 4b, 4c) attached to ends of the electric wires 3, respectively. Each of the electric wires 3 includes a conductor core wire (reference sign omitted) and an insulating sheath (reference sign omitted) that covers an outer peripheral surface of the conductor core wire.

The terminal-equipped electric wire 2a corresponds to a "first terminal-equipped electric wire" according to the present disclosure, and the terminal-equipped electric wire 2c corresponds to a "second terminal-equipped electric wire" according to the present disclosure. Hereinafter, for convenience of description, it is assumed that the terminal 4c of the terminal-equipped electric wire 2c has low resistance to ultrasonic vibration (deformation is likely to occur due to ultrasonic vibration). It is assumed that the terminal 4a of the terminal-equipped electric wire 2a has high resistance to ultrasonic vibration (deformation is less likely to occur due to ultrasonic vibration).

Hereinafter, a joining method for a terminal-equipped electric wire according to a first embodiment to a third embodiment will be described in order. The joining method for a terminal-equipped electric wire according to the embodiments is achieved by the plurality of terminal-equipped electric wires 2 (2a, 2b, 2c), a horn 11, an anvil 12, and an ultrasonic joining machine 13.

First Embodiment

Hereinafter, a joining method for the terminal-equipped electric wire 2 according to the first embodiment of the present disclosure will be described with reference to FIGS. 2 to 6. First, as a first step, conductor core wires of the terminal-equipped electric wire 2a and the terminal-equipped electric wire 2b are placed on the horn 11 (see FIG. 2), and the conductor core wires of the terminal-equipped electric wire 2a and the terminal-equipped electric wire 2b are ultrasonically joined by the horn 11 and the anvil 12 (see FIG. 3).

At this time, the anvil 12 presses the conductor core wires of the terminal-equipped electric wire 2a and the terminal-equipped electric wire 2b toward the horn 11. Therefore, the conductor core wires of the terminal-equipped electric wire 2a and the terminal-equipped electric wire 2b are crushed by the horn 11 and the anvil 12 (see FIG. 3).

Figure 5:
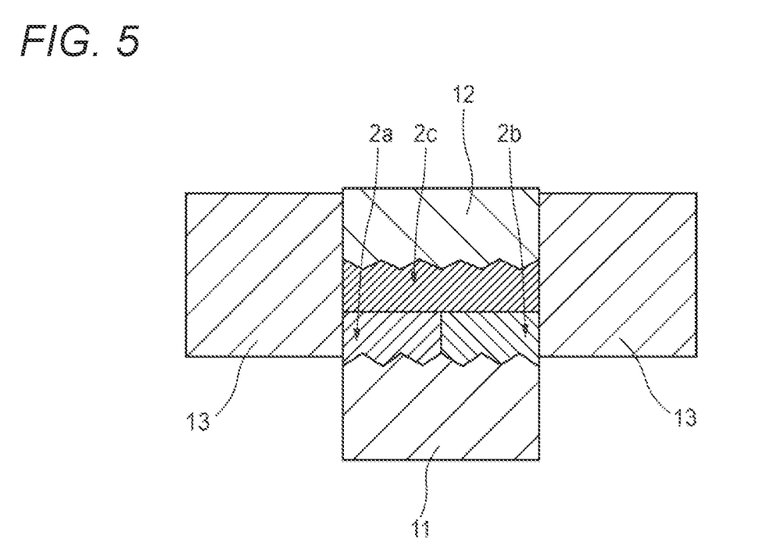
FIG. 5 is a fourth schematic cross-sectional view showing the joining method for a terminal-equipped electric wire according to the first embodiment.

Next, as a second step, a conductor core wire of the terminal-equipped electric wire 2c is placed on the conductor core wires of the terminal-equipped electric wire 2a and the terminal-equipped electric wire 2b that have been crushed (and ultrasonically joined) (see FIG. 4), and the crushed conductor core wires of the terminal-equipped electric wire 2a and the terminal-equipped electric wire 2b and the conductor core wire of the terminal-equipped electric wire 2c are ultrasonically joined by the horn 11 and the anvil 12 (see FIG. 5).

At this time, the anvil 12 presses the conductor core wires of the terminal-equipped electric wire 2a and the terminal-equipped electric wire 2b, and the conductor core wire of the terminal-equipped electric wire 2c toward the horn 11. Therefore, the conductor core wires of the terminal-equipped electric wire 2a and the terminal-equipped electric wire 2b and the conductor core wire of the terminal-equipped electric wire 2c are crushed by the horn 11 and the anvil 12 (see FIG. 5).

Figure 6:
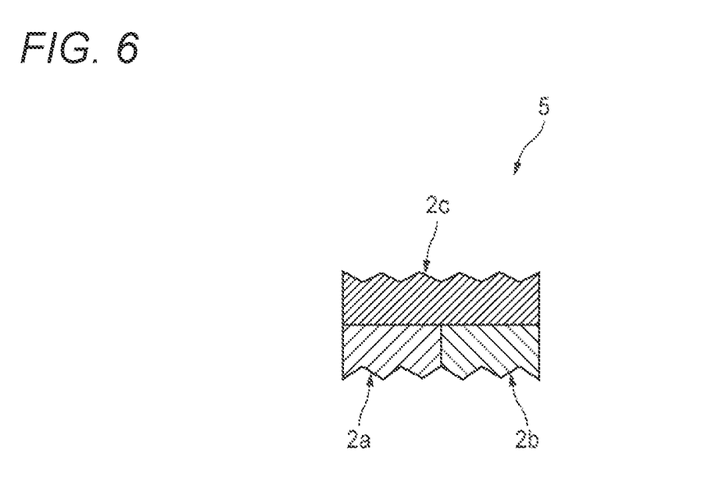
FIG. 6 is a schematic cross-sectional view of the joining portion formed by the joining method for a terminal-equipped electric wire according to the first embodiment.

Accordingly, the conductor core wires in the plurality of terminal-equipped electric wires 2a, 2b, 2c are joined to one another to form the joining portion 5 (see FIG. 6). When the number of the terminal-equipped electric wires 2 is four or more, in the first step, the conductor core wires of the terminal-equipped electric wires 2 excluding the terminal-equipped electric wire 2c are placed on the horn 11, the conductor core wires are crushed and ultrasonically joined, and then the second step is performed. The joining method for the terminal-equipped electric wire 2 according to the first embodiment has been described above.

Second Embodiment

Figure 7:
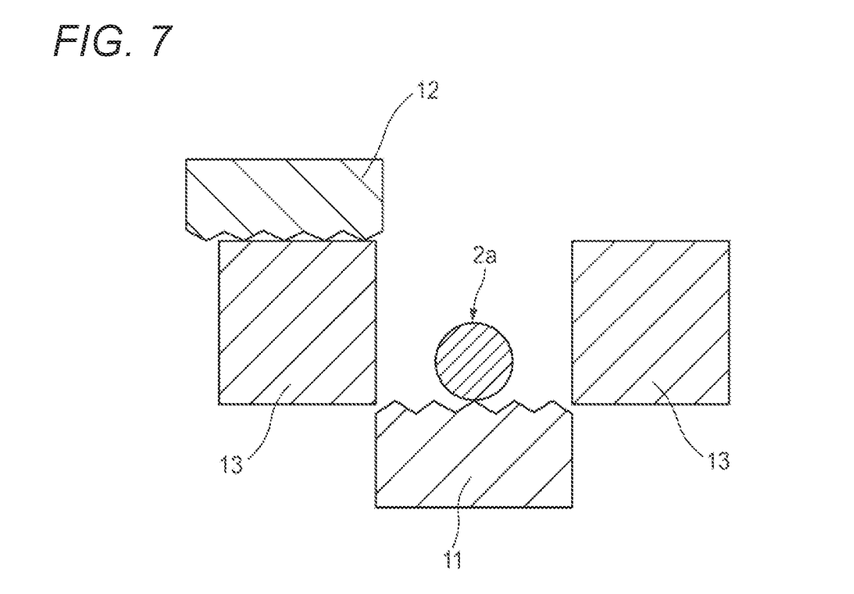
FIG. 7 is a first schematic cross-sectional view showing a joining method for a terminal-equipped electric wire according to a second embodiment, and is also a first schematic cross-sectional view showing a joining method for a terminal-equipped electric wire according to a third embodiment.
Figure 8:
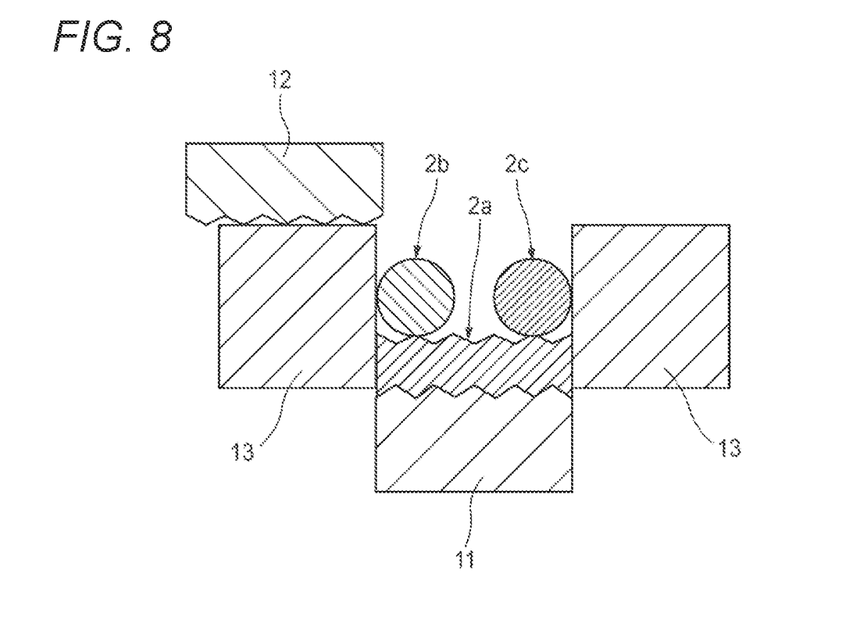
FIG. 8 is a second schematic cross-sectional view showing the joining method for a terminal-equipped electric wire according to the second embodiment.

Hereinafter, a joining method for the terminal-equipped electric wire 2 according to the second embodiment of the present disclosure will be described with reference to FIGS. 7 to 9. First, as a first step, a conductor core wire of the terminal-equipped electric wire 2a is placed on the horn 11 (see FIG. 7), and the conductor core wire of the terminal-equipped electric wire 2a is crushed by the horn 11 and the anvil 12 (see FIG. 8).

Next, as a second step, conductor core wires of the terminal-equipped electric wire 2b and the terminal-equipped electric wire 2c are placed on the crushed conductor core wire of the terminal-equipped electric wire 2a (see FIG. 8), and the crushed conductor core wire of the terminal-equipped electric wire 2a and the conductor core wires of the terminal-equipped electric wire 2b and the terminal-equipped electric wire 2c are ultrasonically joined by the horn 11 and the anvil 12.

At this time, the anvil 12 presses the conductor core wire of the terminal-equipped electric wire 2a, and the conductor core wires of the terminal-equipped electric wire 2b and the terminal-equipped electric wire 2c toward the horn 11. Therefore, the conductor core wire of the terminal-equipped electric wire 2a, and the conductor core wires of the terminal-equipped electric wire 2b and the terminal-equipped electric wire 2c are crushed by the horn 11 and the anvil 12 (see FIG. 9).

Figure 9:
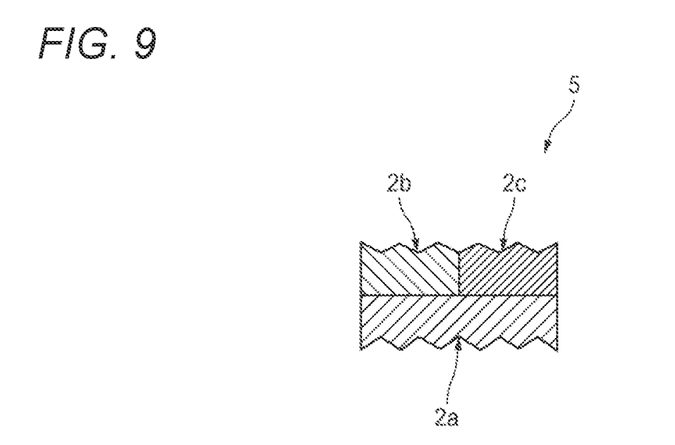
FIG. 9 is a schematic cross-sectional view of a joining portion formed by the joining method for a terminal-equipped electric wire according to the second embodiment.
Figure 10:
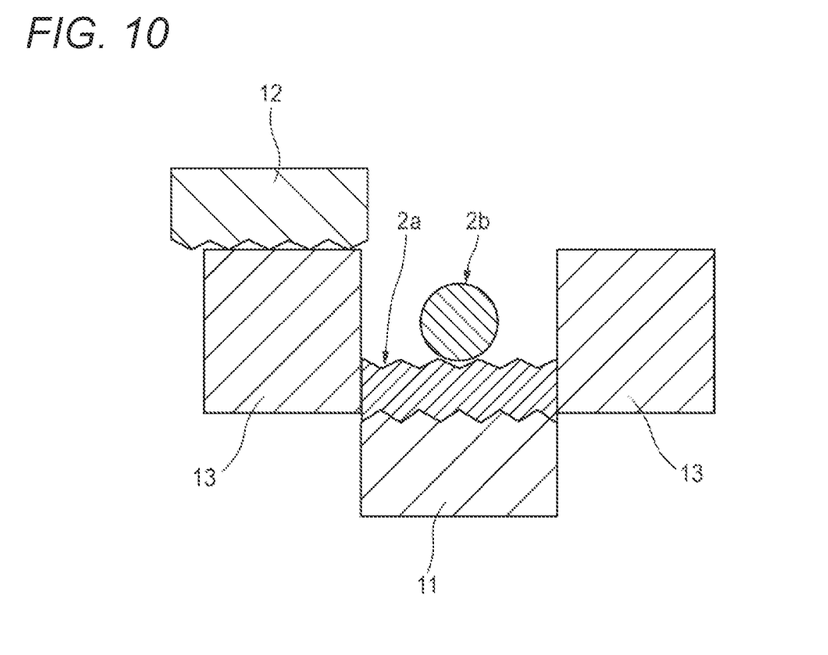
FIG. 10 is a second schematic cross-sectional view showing the joining method for a terminal-equipped electric wire according to the third embodiment.
Figure 11:
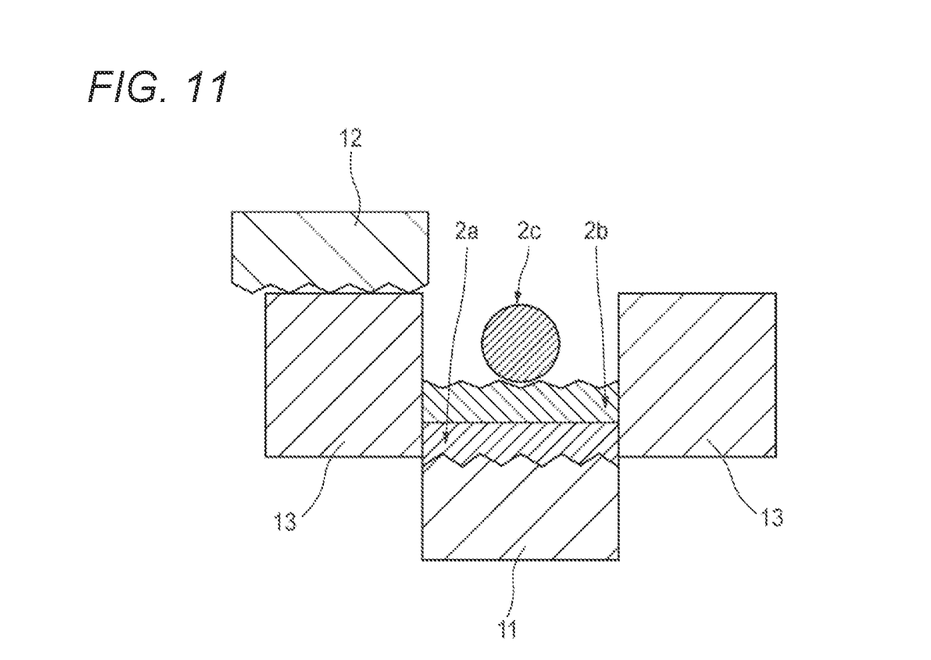
FIG. 11 is a third schematic cross-sectional view showing the joining method for a terminal-equipped electric wire according to the third embodiment.

Accordingly, the conductor core wires in the plurality of terminal-equipped electric wires 2a, 2b, 2c are joined to one another to form the joining portion 5 (see FIG. 9). When the number of the terminal-equipped electric wires 2 is four or more, in the second step, together with the conductor core wires of the terminal-equipped electric wire 2b and the terminal-equipped electric wire 2c, conductor core wires of the other terminal-equipped electric wires 2 are placed on the crushed conductor core wires of the terminal-equipped electric wires 2a, and these conductor core wires are crushed and ultrasonically joined. The joining method for the terminal-equipped electric wire 2 according to the second embodiment has been described above.

Third Embodiment

Hereinafter, a joining method for the terminal-equipped electric wire 2 according to the third embodiment of the present disclosure will be described with reference to FIGS. 7 and 10 to 12. First, as a first step, a conductor core wire of the terminal-equipped electric wire 2a is placed on the horn 11 (see FIG. 7), and the conductor core wire of the terminal-equipped electric wire 2a is crushed by the horn 11 and the anvil 12 (see FIG. 10).

Next, as a third step (a second step in order), a conductor core wire of the terminal-equipped electric wire 2b is placed on the crushed conductor core wire of the terminal-equipped electric wire 2a (see FIG. 10), and the crushed conductor core wire of the terminal-equipped electric wire 2a and the conductor core wire of the terminal-equipped electric wire 2b are ultrasonically joined by the horn 11 and the anvil 12.

At this time, the anvil 12 presses the conductor core wire of the terminal-equipped electric wire 2a and the conductor core wire of the terminal-equipped electric wire 2b toward the horn 11. Therefore, the conductor core wire of the terminal-equipped electric wire 2a and the conductor core wire of the terminal-equipped electric wire 2b are crushed by the horn 11 and the anvil 12 (see FIG. 11).

Next, as a second step (a third step in order), a conductor core wire of the terminal-equipped electric wire 2c is placed on the conductor core wire of the terminal-equipped electric wire 2a and the conductor core wire of the terminal-equipped electric wire 2b that have been crushed (and ultrasonically joined) (see FIG. 11), and the crushed conductor core wire of the terminal-equipped electric wire 2a, the crushed conductor core wire of the terminal-equipped electric wire 2b, and the conductor core wire of the terminal-equipped electric wire 2c are ultrasonically joined by the horn 11 and the anvil 12.

At this time, the anvil 12 presses the conductor core wire of the terminal-equipped electric wire 2a, the conductor core wire of the terminal-equipped electric wire 2b, and the conductor core wire of the terminal-equipped electric wire 2c toward the horn 11. Therefore, the conductor core wire of the terminal-equipped electric wire 2a, the conductor core wire of the terminal-equipped electric wire 2b, and the conductor core wire of the terminal-equipped electric wire 2c are crushed by the horn 11 and the anvil 12 (see FIG. 12).

Figure 12:
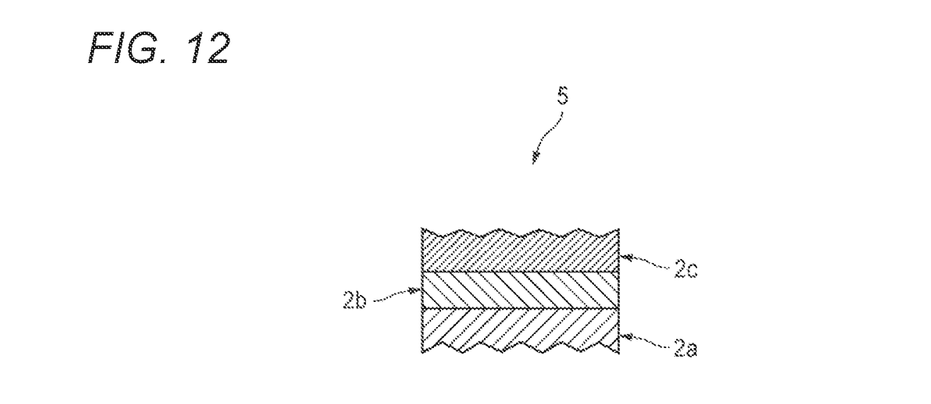
FIG. 12 is a schematic cross-sectional view of a joining portion formed by the joining method for a terminal-equipped electric wire according to the third embodiment.

Accordingly, the conductor core wires in the plurality of terminal-equipped electric wires 2a, 2b, 2c are joined to one another to form the joining portion 5 (see FIG. 12).

Here, when the number of the terminal-equipped electric wires 2 is N (N: an integer of 4 or more), the conductor core wire of one terminal-equipped electric wire 2 (hereinafter, referred to as a "terminal-equipped electric wire 2d". Illustration is omitted) is placed on the conductor core wire of the terminal-equipped electric wire 2a and the conductor core wire of the terminal-equipped electric wire 2b that have been crushed in the third step, and the crushed conductor core wire of the terminal-equipped electric wire 2a, the crushed conductor core wire of the terminal-equipped electric wire 2b, and the conductor core wire of the terminal-equipped electric wire 2d are ultrasonically joined by the horn 11 and the anvil 12. At this time, the conductor core wire of the terminal-equipped electric wire 2a, the conductor core wire of the terminal-equipped electric wire 2b, and the conductor core wire of the terminal-equipped electric wire 2d are crushed by the horn 11 and the anvil 12.

Thereafter, similarly, the crushing and the ultrasonic joining are performed N−4 times. That is, in the third step, the conductor core wires of the plurality of terminal-equipped electric wires 2 are ultrasonically joined to the crushed conductor core wire one by one in order, and then the second step is performed. The joining method for the terminal-equipped electric wire 2 according to the third embodiment has been described above.

Operation and Effect

The joining method for the terminal-equipped electric wire 2 according to the embodiments will be described below. In general, since ultrasonic vibration is applied by the horn, ultrasonic vibration propagating through the terminal-equipped electric wire is attenuated as a distance from the horn increases. In the joining method for the terminal-equipped electric wire 2 according to the present embodiment, when the conductor core wires are joined, the conductor core wire of the terminal-equipped electric wire 2c is placed on the crushed conductor core wire, and thus the conductor core wire of the terminal-equipped electric wire 2c is disposed at a position away from the horn 11. In other words, in the second step, the conductor core wire of the terminal-equipped electric wire 2c does not contact the horn 11. Therefore, deformation of the terminal 4c when the conductor core wires are joined can be prevented.

Further, according to the joining method for the terminal-equipped electric wire 2 in the third embodiment, in the third step between the first step and the second step, the conductor core wires of the plurality of terminal-equipped electric wires 2 are ultrasonically joined to the crushed conductor core wire one by one in order, so that the terminal-equipped electric wire 2c can be moved away from the horn 11 in proportion to the number of the terminal-equipped electric wires 2.

Other Embodiments

It should be noted that the present disclosure is not limited to the above embodiments, and modifications, improvements, and the like can be made as appropriate. In addition, materials, shapes, dimensions, numbers, arrangement locations, and the like of the constituent elements in the above embodiments are freely selected and are not limited as long as the present disclosure can be implemented.

Here, the features of the embodiments of the joining method for a terminal-equipped electric wire according to the present disclosure described above are briefly summarized and listed in first to sixth aspects below.

A first aspect of the present disclosure provides a joining method for a terminal-equipped electric wire in which a plurality of terminal-equipped electric wires (2) including a first terminal-equipped electric wire (2a) and a second terminal-equipped electric wire (2c) are joined each other. The joining method includes a first step of placing at least a conductor core wire of the first terminal-equipped electric wire (2a) among the plurality of terminal-equipped electric wires on a horn (11) and crushing the conductor core wire of the first terminal-equipped electric wire (2a) by the horn (11) and an anvil (12), and a second step of placing a conductor core wire of at least the second terminal-equipped electric wire (2c) among the plurality of terminal-equipped electric wires on the crushed conductor core wire and ultrasonically joining the conductor core wires by the horn (11) and the anvil (12).

According to a second aspect of the present disclosure, in the first step, the conductor core wires of the plurality of terminal-equipped electric wires (2b) excluding the second terminal-equipped electric wire (2c) are placed on the horn (11) together with the conductor core wire of the first terminal-equipped electric wire (2a), and the conductor core wires are crushed and ultrasonically joined by the horn (11) and the anvil (12).

According to a third aspect of the present disclosure, in the second step, the conductor core wires of the plurality of terminal-equipped electric wires are placed on the crushed conductor core wire together with the conductor core wire of the second terminal-equipped electric wire (2c), and the conductor core wires are ultrasonically joined by the horn (11) and the anvil (12).

According to a fourth aspect of the present disclosure, the joining method for a terminal-equipped electric wire further includes a third step of ultrasonically joining the conductor core wires of the plurality of terminal-equipped electric wires to the crushed conductor core wire one by one in order between the first step and the second step.

According to fifth aspect of the present disclosure, in the second step, the conductor core wire of the second terminal-equipped electric wire (2c) does not contact the horn (11).

According to sixth aspect of the present disclosure, a resistance to ultrasonic vibration of a terminal of the first terminal-equipped electric wire (2a) is higher than a resistance to ultrasonic vibration of the second terminal-equipped electric wire (2c).

According to the joining method for a terminal-equipped electric wire having the configuration of the above first to third aspects, as the first step, at least the conductor core wire of the first terminal-equipped electric wire is placed on the horn, and then crushed by the horn and the anvil. Then, as the second step, at least the conductor core wire of the second terminal-equipped electric wire is placed on the crushed conductor core wire including at least the conductor core wire of the first terminal-equipped electric wire, and these conductor core wires are ultrasonically joined. Accordingly, when the conductor core wires are joined, the conductor core wire of the second terminal-equipped electric wire is placed on the crushed conductor core wire, and thus the conductor core wire of the second terminal-equipped electric wire is disposed at a position away from the horn. Here, in general, since the ultrasonic vibration is applied by the horn, the ultrasonic vibration propagating to the terminal of the terminal-equipped electric wire is attenuated as a distance from the horn increases. That is, according to the joining method for a terminal-equipped electric wire in the present configuration, deformation of the terminal when the conductor core wires are joined can be prevented.

According to the joining method for a terminal-equipped electric wire having the configuration of the above fourth aspect, in the third step between the first step and the second step, the conductor core wires of the plurality of terminal-equipped electric wires are ultrasonically joined to the crushed conductor core wire one by one in order, so that the second terminal-equipped electric wire can be moved away from the horn in proportion to the number of the terminal-equipped electric wires.

What is claimed is:

1. A joining method for a terminal-equipped electric wire in which a plurality of terminal-equipped electric wires including a first terminal-equipped electric wire having a first end where a first terminal is arranged and a second end where a conductor core wire is exposed and a second terminal-equipped electric wire having a first end where a second terminal is arranged and a second end where a conductor core wire is exposed are joined each other, the joining method comprising:
   a first step of placing at least the conductor core wire exposed at the second end of the first terminal-equipped electric wire among the plurality of terminal-equipped electric wires on a horn and crushing the conductor core wire exposed at the second end of the first terminal-equipped electric wire by the horn and an anvil, a resistance to ultrasonic vibration of a terminal of the first terminal-equipped electric wire is higher than a resistance to ultrasonic vibration of the second terminal-equipped electric wire; and
   a second step of placing the conductor core wire exposed at the second end of at least the second terminal-equipped electric wire among the plurality of terminal-equipped electric wires above the crushed conductor core wire and ultrasonically joining the conductor core wires by the horn and the anvil with the conductor core wire of the second terminal-equipped wire stacked above the crushed conductor core wire of the first terminal-equipped wire.

2. The joining method for a terminal-equipped electric wire according to claim 1,
   wherein, in the first step, the conductor core wires of the plurality of terminal-equipped electric wires excluding the second terminal-equipped electric wire are placed on the horn together with the conductor core wire of the first terminal-equipped electric wire, and the conductor core wires are crushed and ultrasonically joined by the horn and the anvil.

3. The joining method for a terminal-equipped electric wire according to claim 1,
   wherein, in the second step, the conductor core wires of the plurality of terminal-equipped electric wires are placed on the crushed conductor core wire together with the conductor core wire exposed at the second end of the second terminal-equipped electric wire, and the conductor core wires are ultrasonically joined by the horn and the anvil.

4. The joining method for a terminal-equipped electric wire according to claim 1, further comprising:
   a third step of ultrasonically joining the conductor core wires of the plurality of terminal-equipped electric wires to the crushed conductor core wire one by one in order between the first step and the second step, wherein
   the conductor core wires of the plurality of terminal-equipped electric wires are stacked sequentially to form a welded core with the conductor core of the first terminal-equipped electric wire forming a bottom of the welded core and the conductor core wire of the second terminal-equipped wire forming a top of the welded core.

5. The joining method for a terminal-equipped electric wire according to claim 1,
   wherein, in the second step, the conductor core wire exposed at the second end of the second terminal-equipped electric wire does not contact the horn.

6. The joining method for a terminal-equipped electric wire according to claim 1,
   wherein, the horn and the anvil each have a tooth shaped surface.

* * * * *

UNITED STATES PATENT AND TRADEMARK OFFICE
CERTIFICATE OF CORRECTION

| | | |
|---|---|---|
| PATENT NO. | : 12,438,322 B2 | Page 1 of 1 |
| APPLICATION NO. | : 18/335101 | |
| DATED | : October 7, 2025 | |
| INVENTOR(S) | : Syunsuke Yaoita | |

It is certified that error appears in the above-identified patent and that said Letters Patent is hereby corrected as shown below:

On the Title Page

Please insert the following:
--(30) Foreign Application Priority Data
Jun. 29, 2022 (JP).............................................2022-104796--.

Signed and Sealed this
Ninth Day of December, 2025

John A. Squires
*Director of the United States Patent and Trademark Office*